March 24, 1964   J. T. BENNETT   3,125,799
TOOL HOLDER FOR INDEXABLE CUTTING INSERTS
Filed Sept. 4, 1962   2 Sheets-Sheet 1
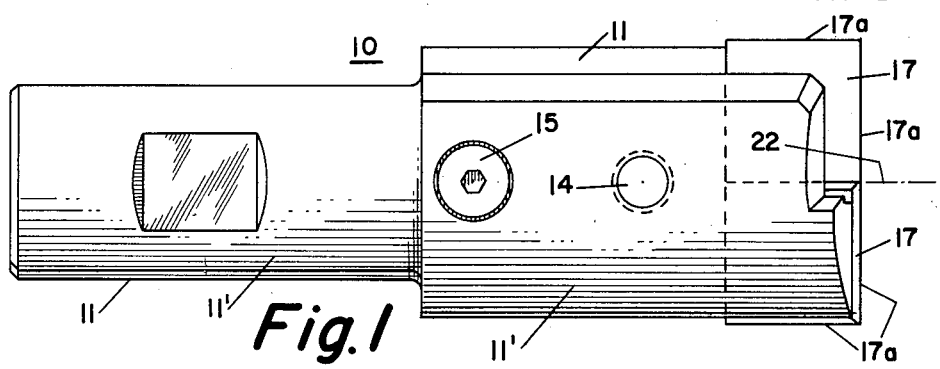
Fig. 1
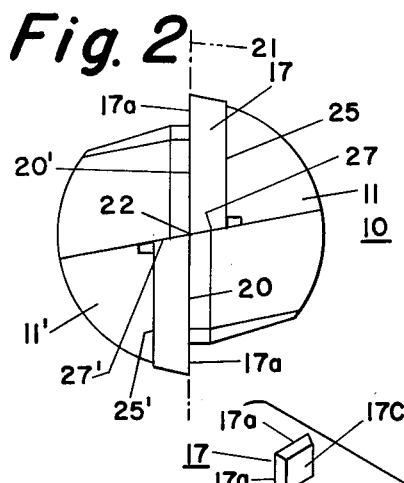
Fig. 2
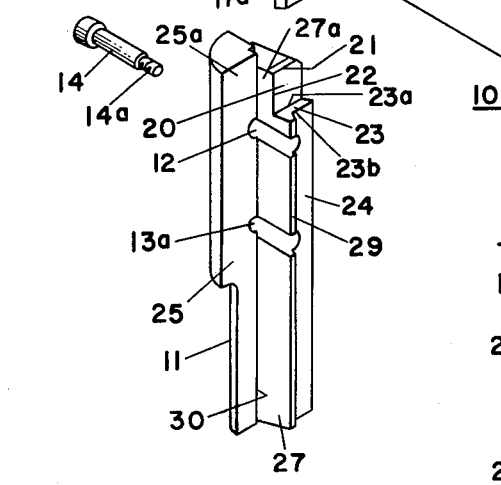
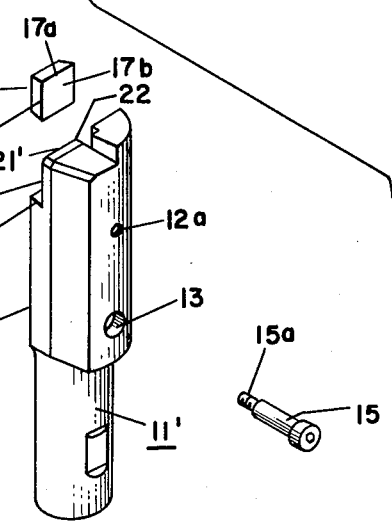
Fig. 4

March 24, 1964  J. T. BENNETT  3,125,799
TOOL HOLDER FOR INDEXABLE CUTTING INSERTS
Filed Sept. 4, 1962  2 Sheets-Sheet 2
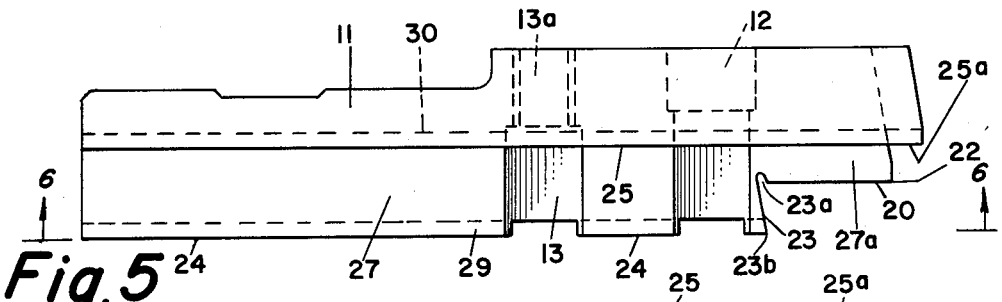
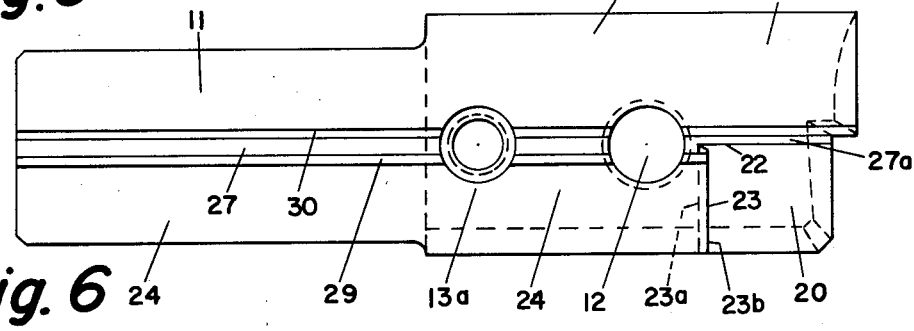
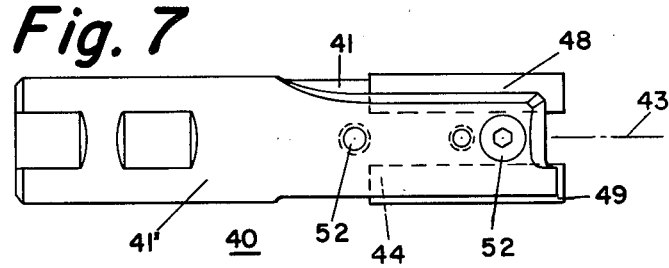
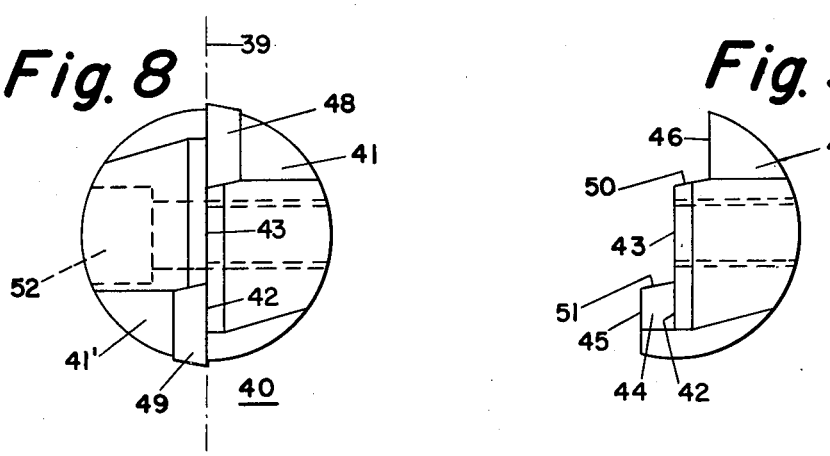

United States Patent Office 3,125,799
Patented Mar. 24, 1964

---

3,125,799
TOOL HOLDER FOR INDEXABLE CUTTING INSERTS
John T. Bennett, R.D. 2, Millstream Drive, Malvern, Pa., assignor of one-half to Frank Di Ferdiando, West Chester, Pa.
Filed Sept. 4, 1962, Ser. No. 221,241
8 Claims. (Cl. 29—105)

This invention relates to a tool holder for cutting inserts and has for an object the provision of a tool holder which is of rugged construction and is particularly adapted for use with cutting inserts of the indexable, throw-away type. This novel tool holder is applicable for use with a center cut end mill, a shell end mill, a counter bore and spot facer and as an indexable insert drill.

Indexable inserts or throw-away inserts as they are sometimes called are used in the machine tool industry for machine turning and cutting tools. Such inserts are relatively flat members formed of carbides, oxides or the like and come in many shapes, such as a square, a rectangle and a parallelogram. The inserts may have cutting edges on their entire periphery or cutting edges merely on one or two sides thereof depending upon their use. The cutting edges are formed on the edge of the anvil surface of the inserts, the opposite surface of the inserts being generally known as the clamping surface.

In the machine tool industry and particularly in connection with end mills with indexable throw-away inserts, it has heretofore been the practice to use a main body member and one or more associated small clamping members for holding the throw-away inserts. The clamping member generally consists of a small piece near one end of the body with screws extending through it into the body member for holding the throw-away inserts. Such construction gives rise to unequalized cutting pressures and the tool pressure exerted against the clamp rather than against the body. When tool holders of such prior art type are provided with a pair of throw-away inserts, it is customary to position the center line of the inserts on the center line of the tool holders. This means that the cutting edges of the respective inserts are ahead of the center line of the tool, such construction being referred to as negative cutting.

The present invention utilizes two symmetrically opposite halves to form the body components which act as a clamp to enclose and mechanically hold the indexable throw-away inserts. The body halves or members are identical when positioned side by side with the exception that the holes for the shoulder screws which extend through the halves of the body will be at different locations since one screw goes through from one side and the other screw goes through from the other and at a different location. This construction permits the surfaces for receiving the throw-away inserts to be ground providing a flat seat to clamp against and thus further insuring accuracy of the cutting tool. This construction additionally relieves pressures which arise through uneven clamping surfaces found in prior art tools.

By making the body in two substantially identical halves, the inserts can extend to the center or longitudinal axis of the body and thus permit cutting to the center. This enables the tool holder of the present design to be used as a center cutting end mill or as a drill depending upon the type of inserts employed. This cannot be accomplished with tool holders of the prior art type using a clamp since the inserts are separated a substantial distance from each other at the center of the tool. Additionally, by using the two substantially identical halves or members for the body, the inserts have their cutting edges disposed along a radial center line of the tool and thus provide zero radial cutting rake as distinguished from negative cutting rake mentioned above.

In accordance with the present invention, there is provided a tool holder for cutting inserts comprising an elongated body constructed by two substantially identical members which when assembled in face to face relation are symmetrically opposite about the longitudinal axis thereof. Each of the members is provided on its face with a first plane surface extending along the radial center line of the body for engagement with the anvil surface of one of the inserts. The first plane surface extends along the longitudinal axis a distance corresponding to the corresponding dimension of one of the sides of the inserts and terminates at the end in a shoulder. The shoulder extends at an angle to the longitudinal axis corresponding to that of a corresponding end of the insert and has a depth slightly less than the thickness of the inserts. The shoulder has an outer edge comprising the end of a second plane surface extending parallel to the first plane surface for substantially the remaining length of the member. A third plane surface is spaced to the side of the first plane surface and parallel to the first and second plane surfaces. The third plane surface extends substantially the entire length of the member for engagement with the clamping surface of one of the inserts. A fourth plane surface extends longitudinally of the member and intersects at least both of the first and third surfaces. The second surface of each member engages the third surface of the other member when assembled and the first surface and shoulder of each member cooperate with the third surface and the fourth surface of the other member to provide pockets for receiving the inserts. Indexable inserts are retained within the pockets with the inserts having cutting edges on the periphery of the anvil surface thereof. The members of the body are secured together in face to face relation with the cutting edges of the inserts in a common plane passing through the longitudinal axis and the radial center line of the body.

For a more detailed disclosure of the invention and for further objects and advantages thereof reference is to be had to the following description taken in conjunction with the accompanying drawings in which:

FIG. 1 is an elevational view of a tool holder embodying the present invention;

FIG. 2 is a view of the right end of the tool holder shown in FIG. 1;

FIG. 3 is a view of the left end of the tool holder shown in FIG. 1;

FIG. 4 is an exploded perspective view of the tool holder shown in FIGS. 1–3;

FIG. 5 is an elevational view of one of the members comprising one-half of the body for the tool holder shown in FIG. 1;

FIG. 6 is a view taken along the lines 6—6 in FIG. 5 and showing the face of one of the body members;

FIG. 7 is a side elevation of a modification of a tool holder embodying the present invention;

FIG. 8 is a view of the right end of FIG. 7; and

FIG. 9 is a fractional view of FIG. 8.

Referring to FIGS. 1–4, it will be seen that the novel tool holder comprises a body 10 utilizing two substantially identical members 11 and 11'. The members 11 and 11' are identical with the exception of the holes 12 and 13 which are adapted to receive the shoulder screws 14 and 15 respectively. The screw 14 is adapted to be inserted first into member 11 with the threaded end 14a thereof extending into a tapped portion 12a in member 11'. Similarly, the screw 15 is adapted to extend first into the opening 13 in member 11' with the threaded end 15a of screw 15 extending into the tapped portion 13a in member 11, FIG. 4. Other than for the screw holes the members 11 and 11' may be made exactly identical.

The tool holder may be used in a stationary position or it may be rotated, the latter being the more common use. In view of this, the outer surface of the body 10 preferably is of a generally circular shape, as may be seen in FIGS. 2 and 3. The respective faces of the members 11 and 11' are so constructed that they may be ground smooth and thus provide even surfaces for clamping the indexable throw-away inserts. As may be seen in FIG. 4, the indexable inserts 17 are of a square configuration and have cutting edges 17a on all four sides of the square. The cutting edges 17a form the edge or periphery of the surface 17b which is commonly known as the anvil surface. The opposite surface 17c of the insert is commonly known as the clamping surface. Since the members 11 and 11' which make up the respective halves of the body member 10 are identical, the various details which are common to each of the members 11 and 11' will only be described in detail with regard to member 11.

As may be seen in FIGS. 4–6, member 11 is provided with a first plane surface 20 which extends along the radial center line 21 of the body 10, FIG. 2. The surface 20 forms one surface of a pocket, hereinafter described, and is adapted to be engaged by the anvil surface 17b of one of the inserts 17. The surface 20 extends along the longitudinal axis 22, FIG. 4, and to a distance corresponding to the corresponding dimension of one of the sides 17a of the inserts 17 and terminates at the end in a shoulder 23. The shoulder 23 extends at an angle to the longitudinal axis 22, FIG. 5, corresponding to that of a corresponding end of the insert 17 and has a depth slightly less than the thickness of the inserts 17. Since the insert 17 which is adapted to be used in this tool holder is square and the four sides thereof are provided with a slope or incline, the shoulder 23 has a corresponding slope or incline and the edges 23a and 23b of the shoulder are perpendicular to the center line 22 of the body. The outer edge 23b comprises the end of a second plane surface 24 which extends parallel to the plane surface 20 for substantially the remaining length of the member 11. At the opposite side of the longitudinal axis 22, there is a third plane surface 25 which is parallel to both of the surfaces 20 and 24 and extends substantially the entire length of the member 11. The upper area 25a of surface 25 is adapted to form another side of a pocket for the indexable inserts and is adapted to engage the clamping surface 17c of one of the inserts 17. A fourth plane surface 27 extends longitudinally of the member 11 parallel to the longitudinal axis 22 and intersects each of the surfaces 20 and 25.

The corresponding portions of the mating member 11' are identical with the above-described portions of member 11 and for convenience have been identified with reference characters with the addition of a prime. When the members 11 and 11' are assembled in face to face relation, they are symmetrically opposite about the longitudinal axis 22 thereof. The surfaces 24 and 24' of the respective members engage respectively the surfaces 25' and 25 and the surface 20 and shoulder 23 of member 11 cooperate with surface 25' of member 11' to form a pocket while surface 20' and shoulder 23' of member 11' cooperate with surface 25 of member 11 to form a second pocket for receiving one of the inserts 17. The upper end 27a of surface 27 forms the inner end of one of the pockets and thus the surface 27 is provided with a slope or is inclined at an angle corresponding to the corresponding end of one of the inserts 17. Since all of the ends or sides of the inserts 17 have the same slope, the slope of surface 27 will be the same as the slope of the shoulder 23. For example, indexable throw-away inserts frequently have an edge with a slope in the order of 5°–11°. Thus, the shoulder 23, as shown in FIG. 5, will make an angle with the vertical of a corresponding amount. Accordingly, if the slope of the edges of the inserts 17 are inclined at 11°, the shoulder 23 in FIG. 5 will be inclined at an angle of 11° with respect to the vertical. Similarly, in FIG. 2, the surface 27 is inclined at an angle of 11° with respect to the horizontal.

To aid in aligning the members 11 and 11' longitudinally and to prevent them from being misaligned transversely of the longitudinal axis, each of the members is provided with an interlocking ledge 29 which extends lengthwise of the members and is adapted to engage and interlock with a corresponding groove 30 on the other member, FIG. 6.

The shoulder screws 14 and 15 secure the two halves 11 and 11' tightly together clamping the inserts 17 in their respective pockets. The shoulders on the screws 14 and 15 insure that the ends are even with each other thereby maintaining the end cutting edges of the inserts in a common plane perpendicular to the longitudinal axis and enabling the halves of the body to be clamped in the same relative position after indexing of the inserts so as to bring new cutting edges into position.

Since the surfaces 20 and 20', which are engaged by the respective anvil surfaces of the inserts 17, are on the radial center line 21 of the body, as shown in FIG. 2, this means that the cutting edges likewise are on the radial center line of the tool itself providing zero radial cutting rake as distinguished from negative cutting rake. Additionally, since the surfaces 20 and 20' not only are on the radial center lines 21 but extend to the center or longitudinal axis 22 of the body, the tool holder may be used for die sinking or boring blind holes. With a tool holder constructed in the foregoing manner, all of the mating surfaces of the body members 11 and 11' may be ground smooth thus relieving pressures which arise through uneven clamping surfaces found in prior tools thereby insuring accuracy of the cutting tool and prolonging the life of the indexable inserts.

While the improved tool holder has been described in connection with a square indexable insert, it is to be understood other shapes of inserts may be used, such as rectangular or parallelogram shapes. Where such other shapes are employed, it is understood that the shoulders 23, 23' and inclined surfaces 27, 27' will be appropriately changed to correspond with the corresponding edges of such inserts. For example, with a parallelogram type of insert, the edges of the shoulders 23 and 23' will not be at right angles to the longitudinal axis, but instead will have the same angle with the axis as the ends of the parallelogram shaped indexable insert. Inserts of this type are useful in drills, shell end mills, counterbores and spot facers.

While the invention has been described in connection with center cutting inserts, that is to say where the cutting on the end of the tool takes place all the way to the center or longitudinal axis of the tool holder, the present invention is not limited to this arrangement. The advantage of having a tool holder formed of two substantially identical halves and with the end cutting edges disposed along a radial center line of the tool so as to provide zero radial cutting rake can also be realized where the cutting edges do not extend to the longitudinal axis of the tool.

Such an arrangement is illustrated in the modification shown in FIGS. 7–9. The tool holder 40 there illustrated comprises two halves or body members 41 and 41'. Since members 41 and 41' are identical, it is believed that a detailed description of member 41 is sufficient. As may be seen in FIGS. 8 and 9, member 41 has a surface 42 extending along the radial center line 39 and through the longitudinal axis 43. A shoulder 44 projects from the surface 42. The outer edge of shoulder 44, FIG. 9, forms the end of a surface 45 which extends longitudinal of the body and parallel to surface 42. At the opposite side of member 41 is another plane surface 46 which extends longitudinal of the member 41 and is parallel to surfaces 42 and 45. Since the cutting inserts 48 and 49 in this modification are rectangular in shape and do not extend to the longitudinal axis 43 of the tool, the shoulder 44 likewise does not extend to the axis 43 nor does the surface 46. The planes of surfaces 42 and 46 are intersected by another plane surface 50 which is similar to the surface 27 descriebd in connection with the embodiment in FIGS. 1–6. However, the surface 50 does not pass through the longitudinal axis 43. There is an additional inclined longitudinal surface 51 which is parallel to surface 50 and spaced to the opposite side of the longitudinal axis 43. As may be seen in FIG. 8, when the members 41 and 41' are assembled in face to face relation, they provide the respective pockets for the cutting inserts 48 and 49 in a manner similar to the embodiment illustrated in FIGS. 1–6. The cutting edges of inserts 48 and 49 extend along the radial center line of the body and provide zero radial cutting rake. The body members 41 and 41' are adapted to be held together by means of suitable shoulder screws 52 which serve to locate and position the ends of the inserts.

While the modification illustrated in FIGS. 7–9 has been shown with rectangular cutting inserts, it is to be understood that other shapes may be used in a manner previously described.

From the foregoing description, it will be seen that in all of the embodiments of the invention the tool holder utilizes two substantially identical halves which when assembled are symmetrically opposite about the axis of rotation. The interlocking ledges, illustrated in connection with FIGS. 1–6, provide positive radial alignment for the body components and retain diametrical accuracy under all cutting pressures incurred during use. The split body construction enables the body components to be utilized as an enclose for and a mechanical device to retain the cutting inserts thereby introducing equalized pressure of the body during machining cycles. The split body construction eliminates pressure being exerted against separate smaller clamping members as utilized heretofore. The present construction further provides that the surfaces of the pockets which enclose the cutting inserts may be readily precision ground and thereby eliminates premature failure of the inserts due to irregular pressures introduced through clamping the inserts against uneven surfaces.

While a preferred embodiment of the invention has been described and illustrated, it is to be understood that further modification thereof may be made without departing from the scope of the appended claims.

What is claimed is:

1. A tool holder for cutting inserts, said tool holder comprising an elongated body constructed by two substantially identical members which when assembled in face to face relation are symmetrically opposite about the longitudinal axis thereof, each of said members having on its face a first plane surface extending along the radial center line of said body for engagement with the anvil surface of one of the inserts, said first plane surface extending along said longitudinal axis a distance corresponding to the corresponding dimension of one of the sides of the inserts and terminating at the end in a shoulder, said shoulder extending at an angle to said longitudinal axis corresponding to that of a corresponding end of the inserts and having a depth slightly less than the thickness of the inserts, said shoulder having an outer edge comprising the end of a second plane surface extending parallel to said first plane surface for substantially the remaining length of the said member, a third plane surface spaced to the other side of said first plane surface and parallel to said first and second plane surfaces said third plane surface extending substantially the entire length of said member for engagement with the clamping surface of one of the inserts, and a fourth plane surface extending longitudinally of said member and intersecting the planes of said first and third surfaces, said second surface of each member engaging said third surface of the other said member when assembled and said first surface and said shoulder of each member cooperating with said third surface and said fourth surface of said other member to provide pockets for receiving the inserts.

2. A tool holder according to claim 1 including indexable inserts retained within said pockets, said inserts having cutting edges on the periphery of the anvil surface thereof, and means for securing said members of said body together in face to face relation with the cutting edges of said inserts in a common plane passing through said longitudinal axis and said radial center line of said body.

3. A tool holder according to claim 1 wherein said shoulder of each said member have edges which extend at right angles to said longitudinal axis of said body.

4. A tool holder according to claim 1 suited for indexable inserts having four cutting edges wherein said shoulder and said fourth plane surface of each of said members have the same slope and which slope corresponds to that of the corresponding edges of the indexable inserts.

5. A tool holder according to claim 1 for center cutting inserts wherein said fourth plane surface passes through said axis of said body and intersects said first, second and third plane surfaces so that said pockets extend outwardly from said longitudinal axis for receiving the center cutting inserts.

6. A tool holder according to claim 1 including an interlocking ledge extending longitudinally along each of said members at the outer edge of said fourth surface and a corresponding recess disposed at the inner edge of said fourth surface, said recess of each member being adapted to receive the corresponding ledge of said other member when in assembled relation.

7. A tool holder according to claim 1 wherein said members of said body are maintained in alignment and secured together in assembled face to face relation by shoulder screws.

8. A tool holder for a center cutting end mill with indexable inserts, said tool holder comprising an elongated body constructed by two substantially identical members which when assembled in face to face relation are symmetrically opposite about the longitudinal axis thereof, each of said members having a first plane surface extending along the radial center line of said body, said first plane surface extending parallel to said longitudinal axis a distance related to the corresponding dimension of one of the sides of the indexable inserts and terminating at the end in a shoulder, said shoulder having inner and outer edges extending at right angles to said longitudinal axis and having a depth slightly less than the thickness of the indexable inserts, said outer edge of said shoulder comprising the end of a second plane surface extending parallel to said first plane surface for substantially the remaining length of the said member, a third plane surface spaced to the other side of said first plane surface and parallel to said first and second plane surfaces, said third plane surface extending substantially the entire length of said member, a fourth plane surface extending longitudinally of said member and passing through said axis of said body and intersecting the planes of said first and third surfaces, said second surface of each member engaging said third surface of the other said member when assembled and said first surface and said shoulder of each member cooperating with said third surface and said fourth surface of said other member to provide pockets extending outwardly from said longitudinal axis for receiving the indexable inserts, and means for maintaining said members of said body in assembled relation.

No references cited.

UNITED STATES PATENT OFFICE
CERTIFICATE OF CORRECTION

Patent No. 3,125,799                          March 24, 1964

John T. Bennett

It is hereby certified that error appears in the above numbered patent requiring correction and that the said Letters Patent should read as corrected below.

In the grant, lines 2 and 12, and in the heading to the printed specification, line 5, for "Frank Di Ferdiando", each occurrence, read -- Frank Di Ferdinando --.

Signed and sealed this 18th day of August 1964.

(SEAL)
Attest:

ERNEST W. SWIDER
Attesting Officer

EDWARD J. BRENNER
Commissioner of Patents